United States Patent [19]

Bielle

[11] Patent Number: 5,105,552
[45] Date of Patent: Apr. 21, 1992

[54] PROCEDURE AND SLIDING SUPPORT FOR A PROFILOMETER

[75] Inventor: Jacques Bielle, F-Chalons Sur Marne, France

[73] Assignee: Institut Superieur D'Etat De Surface (I S E S), Chalons Sur Marne, France

[21] Appl. No.: 362,442

[22] PCT Filed: Sep. 8, 1988

[86] PCT No.: PCT/FR88/00443
§ 371 Date: May 1, 1989
§ 102(e) Date: May 1, 1989

[87] PCT Pub. No.: WO89/02571
PCT Pub. Date: Mar. 23, 1989

[30] Foreign Application Priority Data

Sep. 9, 1987 [FR] France ................. 87 12582

[51] Int. Cl.⁵ ................................ G01B 5/03
[52] U.S. Cl. ...................... 33/573; 33/1 M; 33/503
[58] Field of Search ......... 33/551, 553, 554, 1 M, 33/503, 504, 505, 572, 573

[56] References Cited

U.S. PATENT DOCUMENTS 3,377,711  4/1968  Wempe .
4,594,791  6/1986  Brandstetter ............. 33/503
4,682,418  7/1987  Tuss et al. ............. 33/503 X

FOREIGN PATENT DOCUMENTS 3441426   8/1985  Fed. Rep. of Germany .
2094282   2/1972  France .
2265065  10/1975  France .
0074601   5/1982  Japan ..................... 33/573
2028521   3/1980  United Kingdom .
1581249  12/1980  United Kingdom .

Primary Examiner—Harry N. Haroian
Attorney, Agent, or Firm—Cushman, Darby & Cushman

[57] ABSTRACT

A movable support (5) provided at its bottom surface with a pad (19) made of antifriction material and slidable on a lapped reference surface (2).

The movable support includes discharging jacks (8) which bear indirectly against the frame. The effort corresponding to the sum of the independent efforts of each jack must be lower than the effort exerted by the weight of the movable support and of its optional accessories, so as to minimize the difference between the sliding effort at the beginning and the friction effort of displacement in any direction on one plane and so as to limit, in the displacement referential X,Y,Z, the deviations of the geometrical positions of a sensor or of a tool. A motor (26) and a particular reducer drive the movable support in a translation direction X. There is provided a second drive unit for a translation in the direction Y.

By using as an accessory a micrometric displacement table and a follower, it is possible to take tridimensional profilometric measurements.

22 Claims, 5 Drawing Sheets

PROCEDURE AND SLIDING SUPPORT FOR A PROFILOMETER

BACKGROUND OF THE INVENTION

1. Field of the Invention

This invention deals with a procedure and a device for displacement by sliding a mobile support on which accessories such as a part, a sensor or a tool can be fitted over a reference surface, such that distributed forces can be applied to this mobile support from the bottom upwards.

2. Description of the Prior Art

It is known that every displacement of an object in space is subjected to three geometric deviations from its movement yaw, pitch and roll.

Known solutions, using earlier technologies, propose the use of two slides superimposed on intersecting movements which provoke the superposition of these three geometric deviations and their interactions; moreover, this type of device is tributary to the machining tolerances and to the respective vibrations of each slide which propagate through the sensing system, leading to the existence of defects which can only partly be eliminated. However, in order to improve the performances of existing devices, large and heavy systems have been designed in order to limit the adverse effects of vibrations by the inertia of the device itself. It can be seen that these large parts also have to be accurately machined: leading to equipment which is disproportionately expensive compared with the results obtained.

Another known solution consists of displacing the mobile part relative to a surface, without it coming into contact with it, by means of an air-cushion system. In this case too, vibrations induced by these controlled air leakage systems make this solution unsuitable for some special applications. The air film always has some elasticity and forms a vibration amplifier.

Moreover, the most obvious solution consists of displacing the mobile part by sliding over a reference surface, however the contact pressure is proportional to the mass, thus eliminating all reproducibility of results. In order to be moved by sliding, any mobile part must be pulled or pushed by a force greater than that necessary to maintain it in friction displacement.

The difference in the sliding and friction forces applied to the mobile part controls its geometric position within a coordinate system. Moreover, these frictional values provoke dimensional deviations due to temperature variations; dissymmetry of the load distribution is another direct consequence which is observed and which affects the displacement quality, especially during stopping and starting of a mobile part. Finally there is a premature wear phenomenon of sliding surfaces in contact in this type of construction. Moreover, in order to displace the mobile part, it has to be subjected to as uniform movements as possible, which does not arise in practice.

Electric motor displacement systems with a shaft driving a rotating bolt in a ball screw introduce new defects in addition to the initial defects, which when accumulated make it impossible to carry out high precision measurements. For some applications, for example surface condition measurements, the dispersion of measurements on a profile trajectory can reach a value of 5 micrometers in Z, regardless of the type of sensor placed on the supporting mobile part.

For example, we can quote the case of mean values of irregularity spacings for different types of machining, and spacing (e) and depth (p) values in micrometers:

|  | spacing | depth |
| --- | --- | --- |
| Lathe work | $280 < e < 60$ | $1.5 < p < 15$ |
| Grinding | $180 < e < 7$ | $4 < p < 0.5$ |
| Milling | $400 < e < 17$ | $3 < p < 4$ |

It will be noted that these values require high measuring precision, especially among the Z-axis. At the present time, displacement systems using two intersecting movement tables driven by stepping motors give measuring accuracies of the order of 5 micrometers, incompatible with technical surface irregularity depth measurements. In addition, standard ISO TC 57 uses the term micro-roughness when the depth of irregularities is less than 0,5 micrometers.

There is already a measurement device which uses a procedure corresponding to the foreword in claim 1 (United States patent U.S. Pat. No. 3,377,711). The mobile support displaces along rails by means of roller bearings and is laterally supported by jacks, on which the end of the rod is fitted with a rolling device and for which the offset is limited by roller end stops built into the support and which bear under the rails. This type of procedure does not give a high precision displacement relative to a reference surface, but simply a temporary removal of pressure on the roller bearings during support position changes, in order to avoid deformation of the guide rails which form the geometric displacement reference.

SUMMARY OF THE INVENTION

The purpose of this invention is to correct these disadvantages. This invention, as distinguished in claim 1, solves the problem of manufacturing a device facilitating displacement of a support fitted with an accessory by sliding across a plane reference surface, by reducing the pressure between the said support and the said reference surface to a value which is just sufficient to maintain contact, in order to minimize the difference between the sliding and friction forces to minimize geometric deviations of position in the displacement coordinate system, in other words the uncertainty of displacement sensors in X or in Y, or in X and Y simultaneously.

The purpose of the invention procedure is to displace a mobile support by sliding across a plane X-Y reference surface by means of two motors, and this mobile support can be fitted with accessories, a part, a sensor, or a tool. This procedure is distinguished mainly in that distributed forces are applied to the mobile support from the bottom towards the top, such that the sum of these forces is always less than the weight of the support and the accessories. The procedure requires that sliding is modified to suit the operation carried out by accessories along the Z-axis. The procedure is also distinguished in that the geometric depth deviations of a part are measured continuously and by displacement of the mobile support, using an optical reading, capacitive or thermal fluid flow dimensional measurement sensor mounted on a micrometric forward motion table rigidly attached to this mobile support.

The procedure is also distinguished in that it requires that displacement of the mobile support by sliding takes place during the measurement within the measurement range of the sensor and is interrupted when the limit of the range is reached, while the micrometric forward motion table translates the sensor along the Z-axis in order to start a new continuous measurement of geometric deviations.

The device making use of this procedure includes a mobile support which is fitted with at least three jacks which, through roller devices or friction skids on the upper face of the slides and a skid attached to its lower face, made of a material with a low coefficient of friction, self-lubricating, wear-resistant, and accurately machinable; the skid bears on the reference surface. This mobile support is displaced by means of a screw coupled to the output spindle of a reduction gear through a joint which is fixed in torsion and in tension and is free in all other degrees. The reduction gear is the "Harmonic Drive", driven by a stepping motor. The screw is mounted in a four degree of freedom self-aligning type nut, integral with the mobile support. It is also distinguished in that an accessory such as a stepping motor driven micrometric forward motion table is rigidly mounted on the mobile support. The displacement direction of this table is perpendicular to the reference surface, in other words along the Z-axis.

It is obvious that this type of procedure and device has many advantages, including the following:

a low load on the sliding surfaces, with the advantage of reducing the starting force to make it approach the value of the sliding force, and a more accurately positioned stop and, consequently, and minimizing geometric positional deviations of the sensor when the table starts and stops, leading to a better response.

less heating of parts in motion, and therefore lower thermal geometric deformations, resulting in a better displacement quality.

a reduction of the rotation torque applied to the screws, and therefore minimizing positional uncertainty of elements, at the same time as using lower capacity motors.

high guidance accuracy the possibility of measuring geometric profile deviations such as: deviation of shape, rippling, roughness and, by X-Y displacement, surface level curves.

BRIEF DESCRIPTION OF THE DRAWING

Other advantages and characteristics will result from reading the special non-restrictive methods of manufacture, referring to the attached figures which represent.

DETAILED DESCRIPTION OF THE PRESENTLY PREFERRED EXEMPLARY EMBODIMENT

Figure 1:
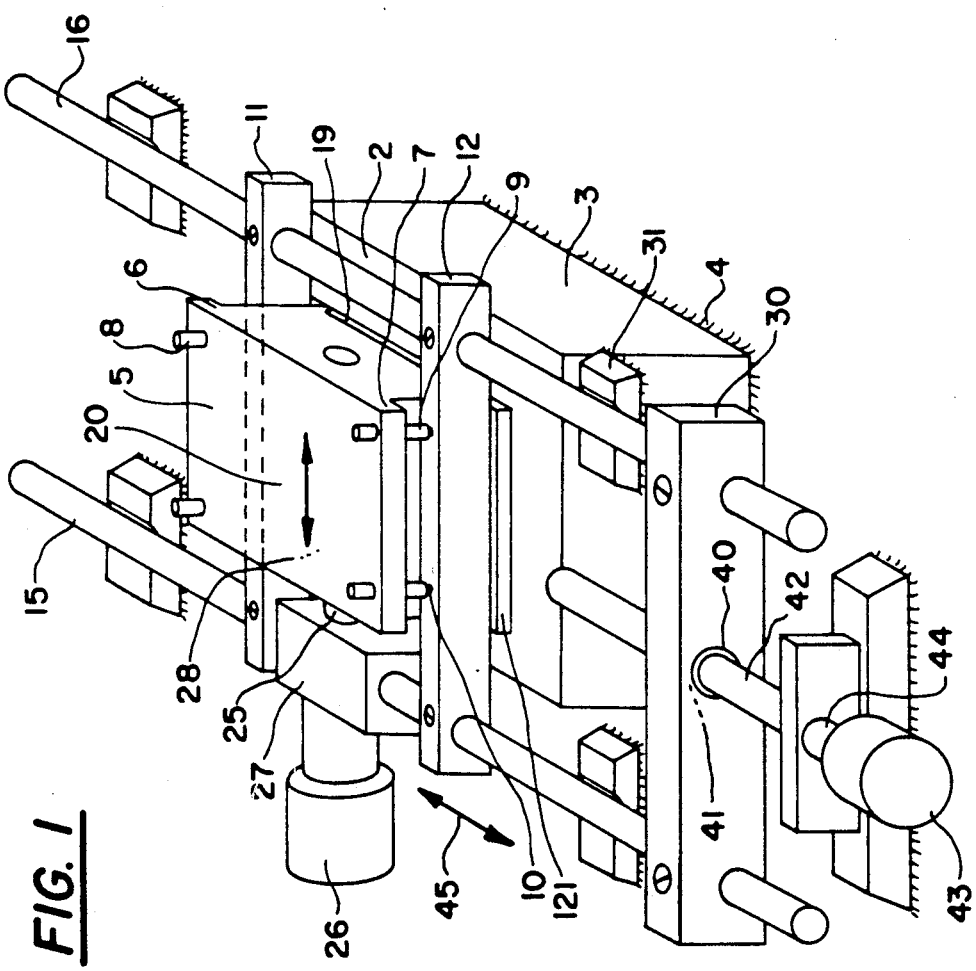
FIG. 1: a perspective view of a device making use of the invention.

FIG. 1 shows the device 1 according to the invention. This device consists mainly of a reference surface 2 which is the upper face of a pattern plate 3 made of diabase, granite or stabilized cast iron which is itself supported isostatically on a stand 4. The reference plane is ground and honed over its entire surface, but a useful area at the center is defined to allow for the uncertainty of planeness near the edges due to honing. Therefore, for a total area of 220 mm×220 mm, only the central 200 mm×200 mm area is used.

The mobile support 5 is placed on this surface 2. The support consists of a parallelepiped block with dimensions less than those of the reference block, and the upper part of which overhangs to create two cantilever edges 6, 7. Jacks such as 8 are rigidly attached to these edges, the force that they exert at their free ends 9 is adjustable, and each is fitted with a means of rolling such as a ball 10, a thrust bearing or a roller bearing for high pressures. These bearings roll in slides 11, 12 which are parallel to the sides of the block supporting the cantilever edges. These slides are fixed to two sliding rods 15 and 16. The spacing between these two slides is slightly less than the width of the moving support taken in a direction perpendicular to the cantilever edges such that the support is slightly prestressed within its elastic limit, thus eliminating play in the direction perpendicular to the displacement direction.

Two counter-slides 111 and 121, located close to the lower face of slides 11 and 12 prevent the table from tipping during manual sensor installation operations.

In order to minimize friction, the mobile support is fitted with ball pistons 18 (FIG. 3) at the sides which are held against the slides by a spring, and can be fixed in position by a pressure screw. The ball can be replaced by a material with a low coefficient of friction, and generally based on polytetrafluoroethylene and its derivatives, with or without filler materials, especially the material marketed under the name TURCITE. In this application, TURCITE is used with bronze as a filler material.

The lower part of the mobile support is also fitted with a 19 mm TURCITE plate, but uses graphite as a filler material to improve sliding on the pattern plate.

This arrangement allows better support of the table on its reference and elimination of all lateral clamping, resulting in the possibility of obtaining perfect alignment of the table with the motor spindle during assembly; the mobile support 5 is also reamed at its center along a direction parallel to slides 11 and 12, and therefore parallel to the direction of sliding indicated by the double arrow 20; this reaming allows the free passage of the threaded screw 25 rigidly attached to the motor spindle 26, of the same diameter as the screw fixed to a support 27, itself locked on rod 15.

The assembly consisting of the table 5, position adjustable support 27, coupling, reduction gear output, screw and nut makes it possible to accurately align the motor spindle and the screw to ensure their concentricity and avoid lateral play of the screw, which would be the cause of positional uncertainties.

The mobile support is fitted with a self-aligning nut 28 with or without play compensation 28. This nut (hidden in view from FIG. 1) is marketed under the name GEMTO, and consists of two nuts which are free to take on a relative oscillating movement. This displacement screw has one or several triangular threads. It is case-hardened, ground, and has a low diameter. The peripheral sliding velocity of the threads is low; this is possible due to the low tension force resulting from the low coefficient of friction between the mobile support and the pattern plate.

Motor 26 is an electric stepping motor, with a special "HARMONIC DRIVE" reducing gear. The reducing gear consists of a deformable pinion gear, rolling by elastic deformation with no play on an internal tooth gear. Due to this elastic deformation of the pinion, there will always be three or four teeth in contact in the pinion-wheel pair, leading to a smoothed mean of angular positional errors of the displacement screw; and consequently of positional areas of the mobile support in the X-Y plane.

Rods 15 and 16 are connected at their ends by a yoke 30 and are supported and guided by four bearings 31 attached to the stand 4.

Yoke 30 is reamed at its center 40 and is also fitted with a self-aligning nut 41 in which a screw 42 is mounted; this assembly is identical to the one described above. An electric stepping motor 43 drives this rod through the intermediate "HARMONIC DRIVE" reduction gear 44. This motor 43 is attached directly to stand 4. The directions of rotation due to this second motorization are shown by the double arrow 45. The "HARMONIC DRIVE" type reduction gear is reserved for the top of the range, since it can be replaced by a gearwheel reduction gear for bottom of the range product.

Figure 2:
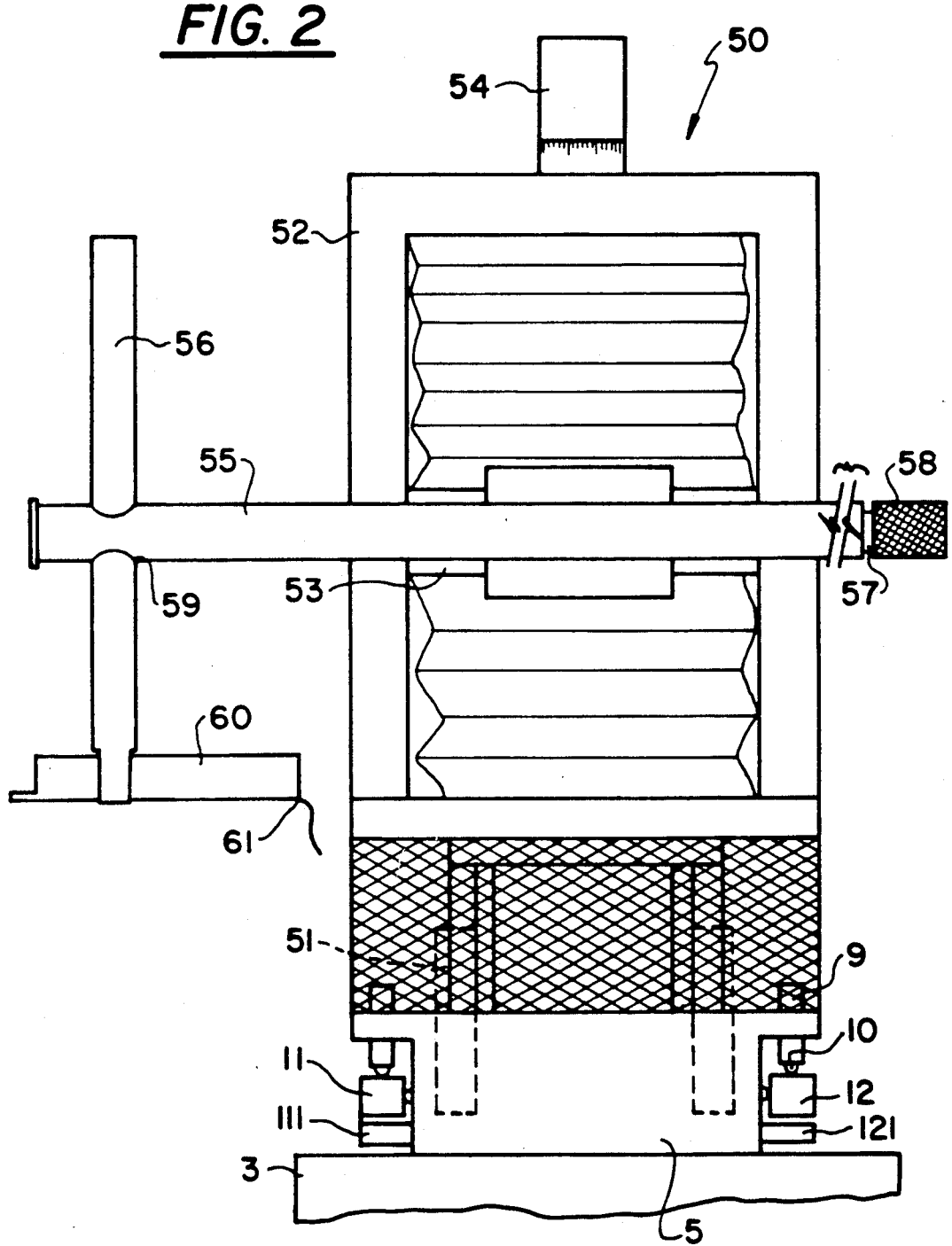
FIG. 2: the installation on the mobile support of a micrometric displacement table for measuring the geometric surface condition.

FIG. 2 shows an accessory which can be installed on mobile support 5. This is a micrometric forward motion table 50. The table is fixed at 51 to the mobile support 5. This table consists of a frame 52 within which an indicator 53 slides along the Z-axis perpendicular to the X-Y plane. This indicator is driven by the screw nut system 54 of a stepping motor installed close to the bottom, to lower the center of gravity of the system. This indicator itself supports a cylindric rod 55, at the end of which is attached a second cylindrical rod 56, perpendicular to the first. By turning the knurled knob 58, an internal rod 57 displaces the third cylindrical rod relative to the first, thus locking the cylindrical rod 56 in the bore 59 reamed in cylindrical rods 57 and 55. Rods 55 and 56 are made of a composite material in order to be anti-vibrational.

At its lower end, the vertical rod 56 is fitted with a sensor 60 which, depending on requirements, can be selected for optical reading, thermal or fluid flow dimensional measurement. This sensor is connected at 61 to a measured results storage and processing unit. The sensor can be replaced by a micro-engraving tool.

Figure 3:
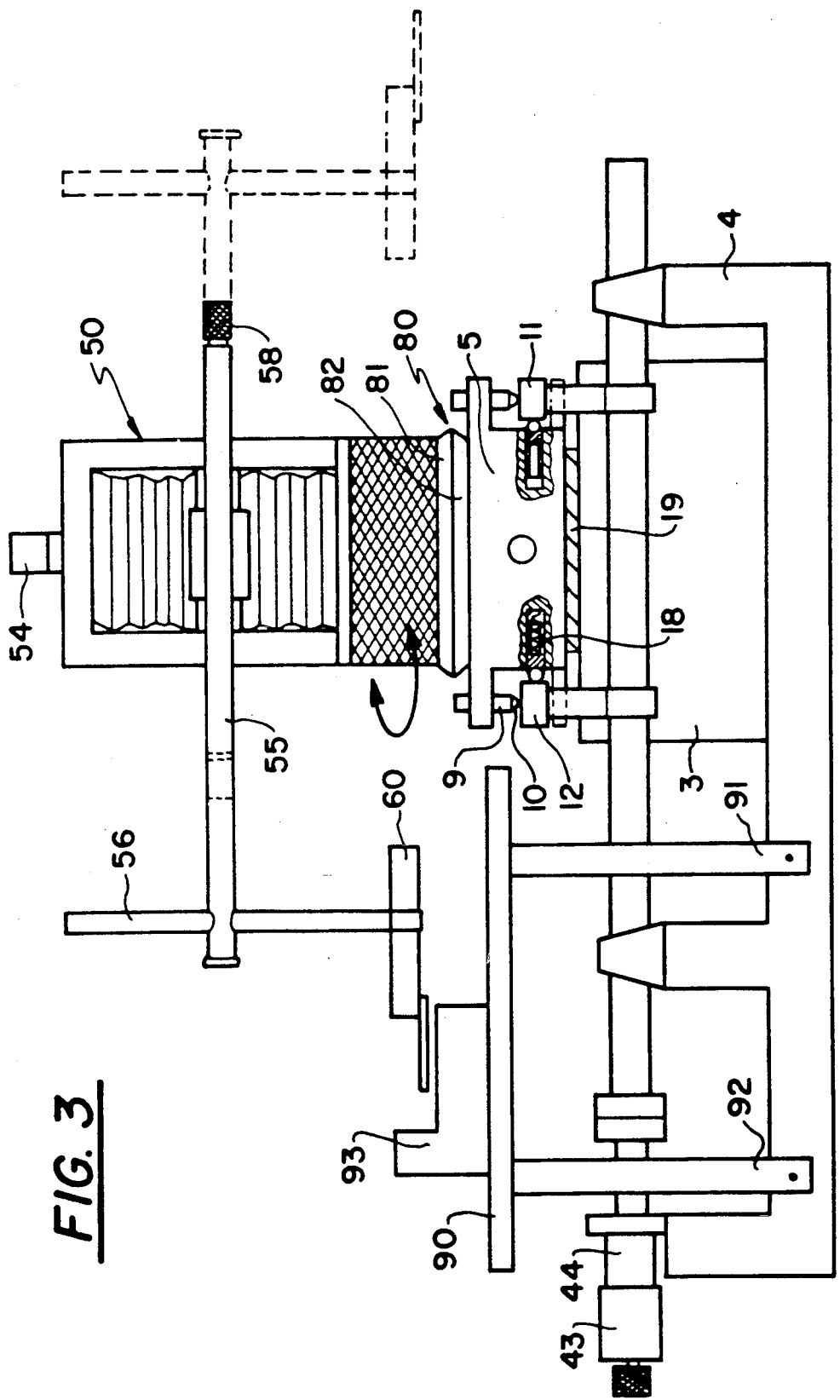
FIG. 3: a lateral view of the complete device with a rotation plate for measuring the surface condition.

FIG. 3 shows a side view of a device according to the invention as shown in FIG. 1, fitted with a micrometric forward motion table as shown in FIG. 2.

It may be used in addition with a rotatable plate 80, of which part 81 is rigidly attached to the table 50 and the other part 82 is rigidly attached to the mobile support 5. The support stand 4 is made of cast-iron stabilized at 44° C. after rough machining, and consists of a ribbed box which rests on supports under the ribs. Its shape is designed to be made by casting without the use of cores. The legs 91, 92 of a table 90 made of aluminium sections with grooves for the attachment of parts 93 can be attached to the stand. This table can be fixed or be made mobile by the addition of a suitable motor drive (not shown).

The part supporting table, like the stand assembly, can also be isolated from external parasitic vibrations by means of conventional dampers.

We will now describe the operation of such a device using the procedure according to the invention.

The procedure consists of calibrating jacks 8 and using them to exert individual forces on slides 15 and 16 such that the sum of these forces is slightly lower than that exerted by the weight of the mobile structure and its accessories.

The mobile support/reference surface interface pressure is reduced, making it possible to obtain a regular very high precision displacements, by making the start force similar to the sliding force and thus limiting geometric positional deviations, taking account of other precision elements added into the mechanical chain.

The frictionless material also absorbs parasitic vibrations.

In its three-dimensional profile meter measurement application, a contact profile meter contact stylus can explore an arbitrary shaped using Professor Jean Mignot's large scale procedure.

Measurement characteristics are then related to the quality of the sensor and to the separation power of the contact stylus.

Measurements are made as follows, the purpose being to determine geometric deviations of shape, rippling and roughness.

Measurements are carried out in space along capture directions X and Y, and along direction Z in depth. The exploration contact stylus is therefore brought into contact with the surface to be checked, within its measurement range, by table 50 driven by the stepping motor. The motor is then stopped and the contact stylus stops. One of the two motors 26 or 43 is then started to apply a translation to the contact stylus along one of the directions X or Y, or the two motors are started simultaneously to travel along a parameter-defined, for example circular, trajectory (for gasket bearing surfaces). At the same time, deviations detected by the contact stylus are recorded by means of a processing and storage unit. When the sensor reaches the limit of its measurement range in Z in a first window, the X or Y displacement is interrupted, and, depending on the general measurement profile, in other words depending on whether the sensor has reached the lower or upper limit of the measurement range, the table applies a micro displacement upwards or downwards to the contact stylus. The profile is then checked again in a second window.

These steps are repeated to cover the entire surface to be checked. The computer processing then connects the successive windows to build up the measured profile. It should be noted that in this large scale method, the accuracy of measurements is not a function of the Z displacement uncertainty, but only the precision of the sensor.

Figure 4:
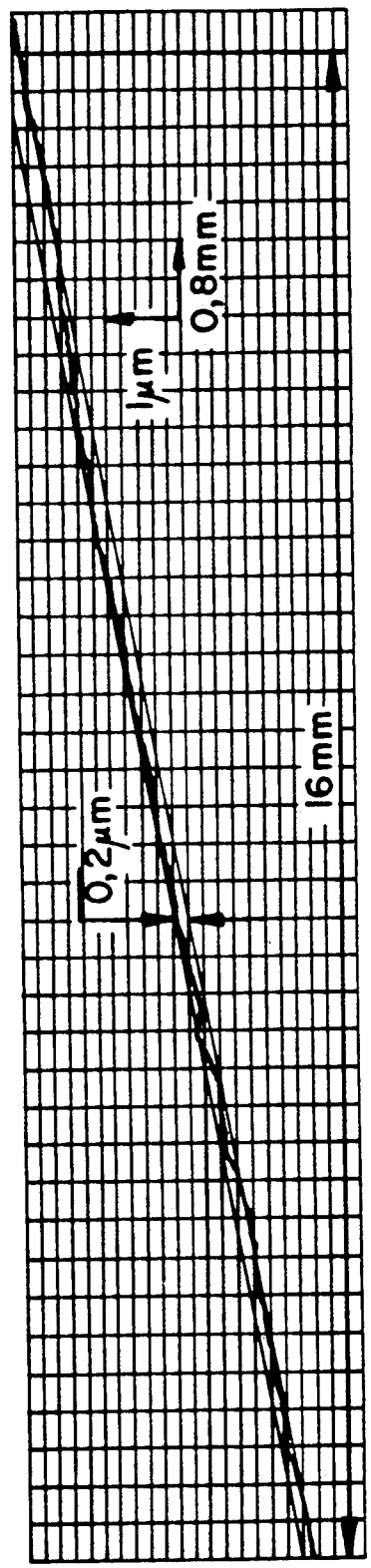
FIG. 4: the curve of results obtained using the device according to the invention.

All these steps are controlled by the processing unit in a known manner and the result obtained is shown for a specific example in FIG. 4.

The mean accuracy is 0.2 micrometers over a length of 16 mm. The general slope of the curve is due to a parallelism offset between the plane of the surface to be checked and the reference surface, which does not affect the obtained accuracy. The positioning of the measured profile within the system of axes is easily carried out in the processing by calculating the least squares straight line from the measured profile and then replacing it parallel to the X axis, the measured profile is replaced in the same manner, and it is also noted that measurement using this procedure is independent of the displacement precision along the Z-axis.

For very high precision and micro-roughness, the sensor can be fitted with a skid resting on a reference surface supported on the part. The depth of irregularities in the surface to be explored is then evaluated relative to this reference, and the sensor is always moved by X and Y displacements and is positioned in the Z direction by the large scale procedure. In this case, geometric positional uncertainties of the contact stylus are always less than 0.05 micrometers.

A three-dimensional image is obtained by processing curves obtained along the two axes X and Y put side by side. Therefore, the depth image can be anamorphosed differently along X, Y or Z, so that a suitable subsequent surface treatment can be selected.

The invention is not restricted to the above-mentioned application, but it includes improvements available to men in the profession.

For example, the internal sensor holder rod can be coated internally with an anti-vibration material, which may also act as counterweight to the sensor.

There are many applications, since the procedure for obtaining a high precision and perfectly uniform sliding is applicable to the profilometer measurement, and also to dimensional measurement, part transport or displacement of a tool.

Similarly, instead of using a contact stylus, a contact detector could be used, mounted on a long travel sensor, in order to consider only the shape of parts.

Still as part of the invention an axial load relief table could be made.

In the same way as for the air cushion in translations, the air support can be a hindrance in some applications due to the inherent vibrations that it generates due to elasticity of the air film.

This type of axial load relief table is used for the special application of replacing high precision air supported vertical towers in environments exposed to vibrations.

Figure 5:
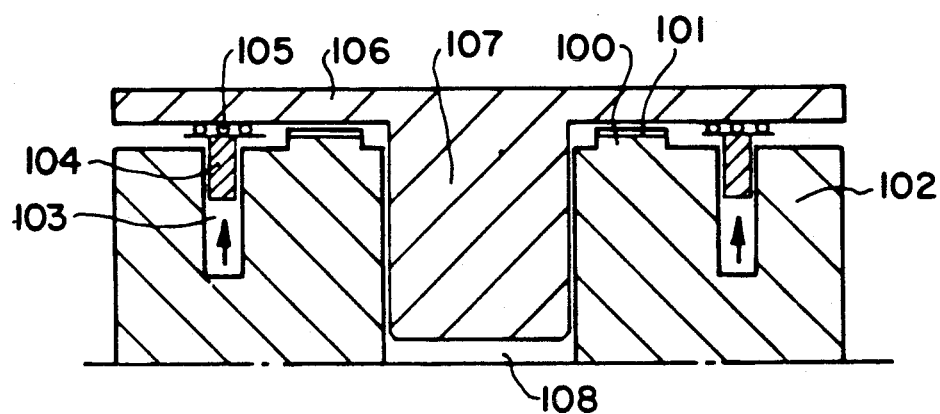
FIG. 5: longitudinal section of the device with rotating mobile support.
Figure 6:
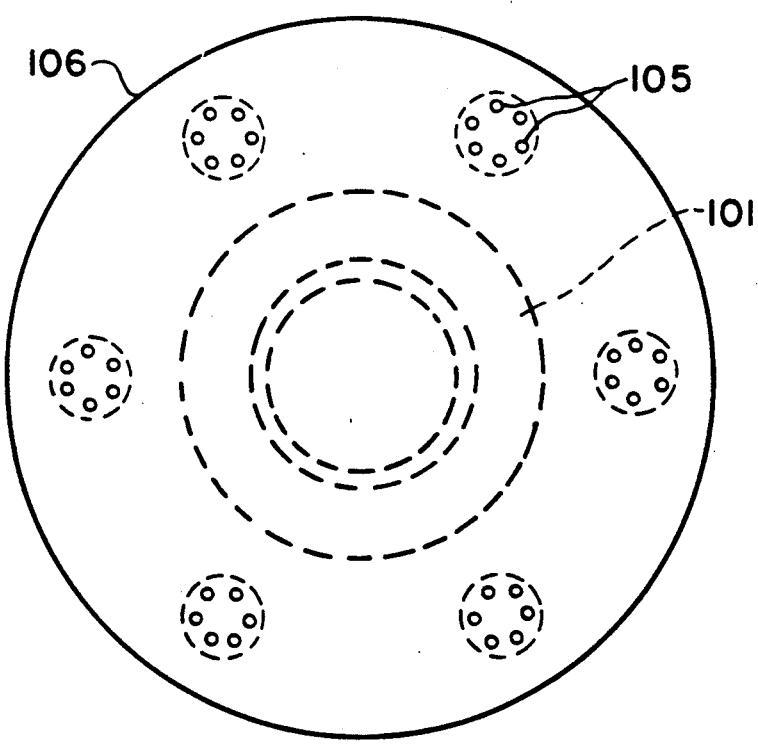
FIG. 6: top view of the device with rotating mobile support.

FIGS. 5 and 6 show an axial load relief table.

The reference surface 100 is coated with an antifriction material at the upper part of the stand 102. Non-outletting bores 103 are reamed in this frame, in which pistons 104 slide, this forming jacks which, in the main variant, can be supplied by air or another fluid, or even replaced by elastic means such as springs.

At their ends, these jacks are fitted with balls 105, to allow the plate itself 106 to rotate, and this plate is also centered on its center line 107 inside bore 108 in the stand. There would be advantages in the use of magnetic centering. The load relieving jacks could easily be replaced by a magnetic compensation system. They are laid out at constant angular spacing to ensure isostatic discharge; they may be on concentric circles.

It is understood that the procedure may be implemented by placing the device directly on the parts to be tested, mainly due to the rotation of the accessory shown in dashed lines on FIG. 3.

The position of the mobile support can be visually determined within the limits of its displacements. An X indicator marks the X position of the mobile part on a graduated scale.

A Y indicator indicates the Y position of the mobile part on a graduated scale.

The Z table has a Z identification indicator.

Each mobile part X and Y end of travel is limited by a micro-switch which stops rotation of the stepping motor; the same applies in Z.

When the mobile support is in contact with a micro-switch, it simply accelerates to release it.

The micro-switches do not move with the mobile part, thus avoiding the movement of electric cables.

I claim:

1. A displacement device having a mobile support slidable on a reference surface, said mobile support able to be fit with accessories including any of a part, sensor and tool, wherein forces are exerted on the mobile support so that the forces are distributed in a direction from a bottom of the support upwards, the displacement device comprising:

mobile slides having an upper face that support the mobile support through a jack and roller devices; and said mobile support having a lower face fit with at least one skid having a low coefficient of friction as well as a self-lubricating, wear resistant, precision machinable bearing that contacts the reference surface, and said mobile support further including adjustable lateral alignment devices that contact the mobile slides.

2. A device according to claim 1, wherein the mobile support is prestressed within an elastic limit between internal faces of the mobile slides.

3. A device according to claim 1, wherein the lateral alignment devices include ball pistons, returned by a spring, and wherein a position of said ball pistons can be locked by a pressure screw.

4. A device according to claim 1, wherein the skid is made of one of polytetrafluoroethylene, and one of its derivatives, optionally including filler materials.

5. A device according to claim 1, wherein the mobile support includes a bore fitted with a fixed self-aligning nut along a direction parallel to the mobile slides.

6. A device according to claim 1, wherein the displacement of the mobile support is obtained by means of a motor rigidly attached to mobile slides, a screw and a nut.

7. A device according to claim 6, wherein the screw has a small diameter and has at least one triangular shaped, case-hardened, quenched and ground thread.

8. A device according to claim 1, wherein the reference surface is an upper face of a pattern plate block made of a member selected from the group consisting of diabase, granite and ground stabilized cast-iron, said block being isostatically supported on three bearings rigidly attached to a chassis.

9. A device according to claim 1, further comprising a table attached to the mobile support driven by a stepping motor micrometric forward advance system, and wherein a Z displacement is perpendicular to a plane of the reference surface.

10. A device according to claim 9, wherein an index of the table is fitted with a rod supporting a sensor, said rod being oriented perpendicular to the mobile slides.

11. A device according to claim 9, wherein a rotatable plate is inserted between the mobile support and the micrometric forward advance table.

12. A device according to claim 9, wherein the support rod is fitted with a locking rod with an internal vibration absorbing coating.

13. A device according to claim 1, wherein the sensor is selected from the group consisting of a thermal, capacitive, fluid flow and optical reading dimensional measurement sensor.

14. A device according to claim 1, wherein the mobile slides are rigidly attached to rods by a translation system including a motor, a reduction gear, a threaded rod, a yoke and self-aligning nut.

15. A device according to claim 6 or 14, wherein the motor is an electric stepping motor fitted with a gear wheel reduction gear.

16. A device according to claim 1, wherein the mobile support comprises a rotating plate, sliding on skids coated with an anti-friction material, with load relief being supplied through piston jacks sliding in bores machined in a support stand, and said piston jacks being fit at their upper end with a ball;

wherein the mobile support is centered within a bore in the stand.

17. A displacement procedure for sliding a measurement device having a mobile support optionally including at least one of a part, a sensor and a tool over a reference surface, said procedure comprising the steps of exerting distributed forces from a bottom in an upwards direction on the mobile support, wherein a sum of the forces is less than a weight of the mobile support to thereby guarantee isostatic load relief.

18. A procedure according to claim 17, wherein the mobile support is rotatable and is slid over an annular surface, the exerting step including exerting forces at constant angular spacings on said mobile platform, wherein said forces are exerted over at least one concentric circle.

19. A procedure according to claim 17 or 18, further comprising the step of applying the procedure for profiling meter measurements, wherein displacements are adapted to an operation function to be carried out by means of accessories along a Z-axis.

20. A procedure according to claim 19, further comprising measuring three geometric depth deviation parameters, said parameters being shape deviation, rippling and roughness and micro-roughness, using a second sensor mounted on a micrometric forward motion table attached to the mobile support.

21. A procedure according to claim 20, further comprising placing items to be tested on a support table rigidly fixed to the measurement device so that measurements may be taken.

22. A procedure according to claim 20, further comprising performing measurements on large items by placing the device directly on the item.

* * * * *